United States Patent [19]

Persyk et al.

[11] Patent Number: 4,879,465

[45] Date of Patent: Nov. 7, 1989

[54] DETECTOR MODULE FOR SCINTILLATION CAMERAS

[75] Inventors: Dennis E. Persyk, Barrington; Hamill James J., Rolling Meadows, both of Ill.

[73] Assignee: Siemens Gammasonics, Inc., Des Plaines, Ill.

[21] Appl. No.: 174,574

[22] Filed: Mar. 29, 1988

Related U.S. Application Data

[63] Continuation-in-part of Ser. No. 913,798, Sep. 30, 1986, Pat. No. 4,810,885.

[51] Int. Cl.$^4$ ............................................. G01T 1/164
[52] U.S. Cl. .............................. 250/363.02; 250/366; 250/367; 250/369
[58] Field of Search .................. 250/366, 367, 363.01, 250/363.02, 369

[56] References Cited

U.S. PATENT DOCUMENTS

| | | | |
|---|---|---|---|
| 4,037,105 | 7/1977 | Lauer | 250/367 |
| 4,672,207 | 6/1987 | Derenzo | 250/366 |
| 4,677,299 | 6/1987 | Wong | 250/363.03 |
| 4,810,885 | 3/1989 | Persyk | 250/369 |

FOREIGN PATENT DOCUMENTS 2543691  10/1984  France ........................... 250/361 R

OTHER PUBLICATIONS

Kesselberg, "Temperature Influence on a Dual Crystal Positron Camera", Nucl. Instru. and Methods, A243, 1986, pp. 578-582.

*Primary Examiner*—Carolyn E. Fields
*Attorney, Agent, or Firm*—Mark H. Jay

[57] ABSTRACT

A detector module for use in scintillation cameras utilizes a plurality of elongated scintillator strips. A temperature gradient is established along the length of each strip. By identifying the particular strip in which a scintillation event has taken place and by measuring the decay time of the scintillation event, two-dimensional information can be developed. This permits a scintillation camera detector to be modularized and largely eliminates the problems of edge packing.

5 Claims, 2 Drawing Sheets

DETECTOR MODULE FOR SCINTILLATION CAMERAS

CROSS-REFERENCE TO RELATED APPLICATION

This application is a continuation-in-part of commonly-owned application Ser. No. 913,798, filed Sept. 30, 1986, now U.S. Pat. No. 4,810,885. The entire disclosure of this parent application, including the drawings, is hereby expressly incorporated into this application as if fully set forth.

BACKGROUND OF THE INVENTION

The invention relates to scintillation cameras, and more particularly relates to detectors which are used in such cameras. In its most immediate sense, the invention relates to detectors in which a temperature gadient is established across the scintillator.

In a conventional scintillation camera, the X-Y location of a scintillation event is determined by evaluating the outputs of a plurality of photomultiplier tubes which view the event. These photomultiplier tubes are connected to a resistor matrix and the X and Y coordinates of the detected event are computed by appropriately weighting the outputs of the photomultiplier tubes involved.

A scintillation camera conventionally utilizes a large scintillation crystal which must be relatively uniform throughout its entire volume. As a result, such crystals are relatively expensive.

Further, it is impossible to locate scintillation events at the periphery of the crystal with the same degree of accuracy that is possible in the center of the crystal. Events within approximately one tube radius of the crystal edge are incorrectly located because of edge reflections. This is because of the problem of "edge packing", i.e., the inability to properly locate an event at the periphery due to edge effects.

It would be advantageous to simplify the existing circuitry which is used to evaluate and compute the location of a detector scintillation event.

It would also be advantageous to modularize the detectors which are used in scintillation camera systems.

It would likewise be advantageous to produce a detector module which did not suffer as greatly from the problem of "edge packing".

It would further be advantageous to generally improve on known devices of this type.

SUMMARY OF THE INVENTION

In accordance with the invention, a detector module produces X-Y information by utilizing a plurality of parallel scintillator strips. A temperature gradient is established along one axis of the detector module and the scintillator strips extend along another perpendicular axis. Means are provided for identifying the particular scintillator strip in which a scintillation event occurs and for monitoring the decay time of the scintillation event. Because the decay time is a function of the temperature of the site at which a scintillation event takes place, and because this temperature is associated with a particular location along the scintillator strip, the decay time provides information about e.g. the X coordinate of a detected scintillation event. Because the particular scintillator strip in which the event occurs is associated with a particular Y coordinate, both the X and Y coordinates of a detected scintillation event can be determined. Advantageously, the decay time of the scintillation event is determined by evaluating the output of a photomultiplier tube. While the use of a photomultiplier tube is common in scintillation camera detectors, the use of the tube in this application is unique because the tube is not used to measure anything except the energy of the scintillation event and the decay time of the event. There is no weighting of the signals from a plurality of photomultiplier tubes.

Further advantageously, the scintillator strips are made of different scintillator materials, which have distinguishable decay time versus temperature responses. The scintillator strips are linked together in groups (e.g. in pairs if two different scintillator materials are used; in triplets of three different scintillator materials are used, and so on) and each group is optically linked to a common photodiode. The output of the photodiode localizes the scintillation event to the group level along the Y axis, and the decay time as measured by the photomultiplier tube localizes the event to a particular scintillator strip (i.e. a particular Y coordinate) and to a particular X coordinate.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

While the preferred embodiment is illustrated as if it were used in a gamma scintillation camera, it is also applicable to a PET (position emission tomography) scanner or other scintillation camera. The type of radiation to which the scintillator responds is not part of the invention.

Figure 1:
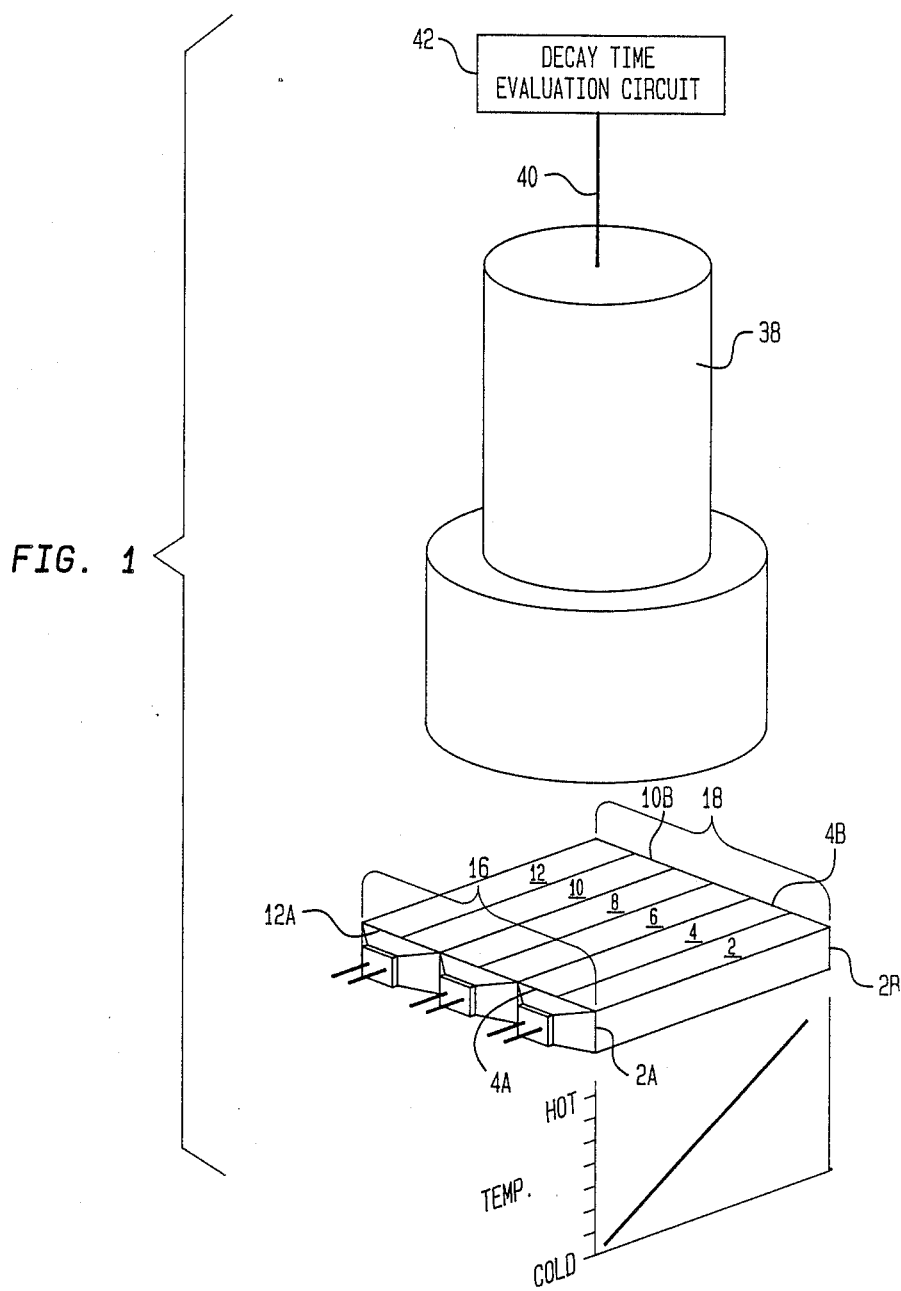
FIG. 1 is a schematic illustration of a preferred embodiment of the invention.

FIG. 1 shows a plurality (here, six but the number is not part of the invention) of elongated scintillator strips 2, 4, 6, 8, 10 and 12 which are arranged to form a rectangular region. Advantageously, the strips are ¼ inch wide by ½ inch thick by 3 inches long, but these dimensions are not part of the invention. (The width of the strip determines the resolution of the detector module and the ¼ inch figure was chosen because such a resolution is believed satisfactory for nuclear medicine application. The thickness of the strip determines the stopping power of the scintillator and ½ inch was chosen because this thickness will stop 90–95% of all incident 140 keV gamma radiation. The length of 3 inches was chosen because one common photomultiplier tube has a 3 inch diameter.) Each scintillator strip has a first end (e.g., 2A, 4A, etc.) and a second end, (2B, 4B, etc.) and all the first ends (2A, 4A, etc.) of the strips are aligned to form a first side 16 of the region and all the second ends of the strips (2B, 4B, etc.) are aligned to form a second side 18 of the region. The region is normal to the direction of incidence of incoming gamma radiation.

In this preferred embodiment, half the scintillator strips (here, scintillator strips 2, 6 and 10) are made of NaI(Tl) and the other half (namely scintillator strips 4, 8 and 12) are made of CsI(Na). As shown, the scintillator strips are alternated so that adjacent scintillator strips are always made of different materials.

Figure 2:
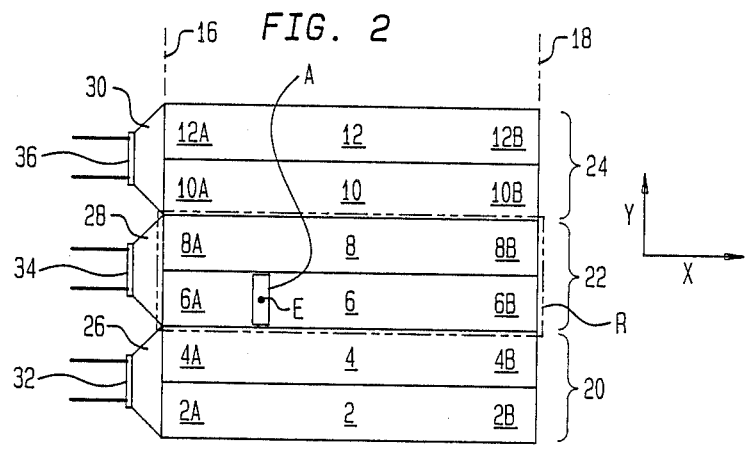
FIG. 2 is a schematic top view of scintillator strips in accordance with the preferred embodiment.

As a result of this arrangement, the scintillator strips 2, 4 ... 12 form three pairs 20, 22 and 24, each pair 20, 22 and 24 containing a CsI(Na) strip and a NaI(Tl) strip. Thus, the pair 20 contains a NaI(Tl) scintillator strip 2 and a CsI(Na) scintillator strip 4. The first end of each of the strips in each pair (e.g. 2A and 4A) are optically coupled together through a small light pipe, (e.g. 26) which is also coupled to an avalanche photodiode (e.g. 32 FIG. 2). The six strips are all optically coupled (as by a large light pipe, not shown) to a photomultiplier tube 38. The output 40 of the photomultiplier tube 38 is connected to a circuit 42 which is used to determine the decay time of scintillation events registered by the photomultiplier tube 38. The details of such circuits are known to persons skilled in the art and are therefore not described here. Some such details are contained in the above-referenced copending patent application.

A temperature gradient is established along the lengths of the scintillator strips 2, 4 ... 12. The first side 16 is held at a temperature of approximately 0° C. or below, and the second side 18 is held at a higher temperature. The temperature gradient is chosen to provide the resolution desired; the greater the gradient, the greater the resolution. 0° C. was chosen because this reduces thermal noise output from the photodiodes described below.

As is disclosed in the above-referenced copending patent application, the decay time of a scintillation event detected by the photomultiplier tube 38 represents the location of the event along the X axis where, as here, a temperature gradient is established in the X direction. Further, the Y position of the event is represented (to an accuracy equalling the width of a scintillator strip) by the particular strip (e.g. 2, or 4 etc.) in which the scintillation event has taken place. It would be possible to identify the strip (and therefore the Y coordinate) by mounting an avalanche photodiode to each individual one of the scintillator strips and registering, for each scintillation event, the identity of the correspondingly fired photodiode. However, this would be costly because avalanche photodiodes are highly expensive. Accordingly, in the preferred embodiment, the number of these photodiodes (e.g. 26, 28 and 30) is reduced.

Figure 3:
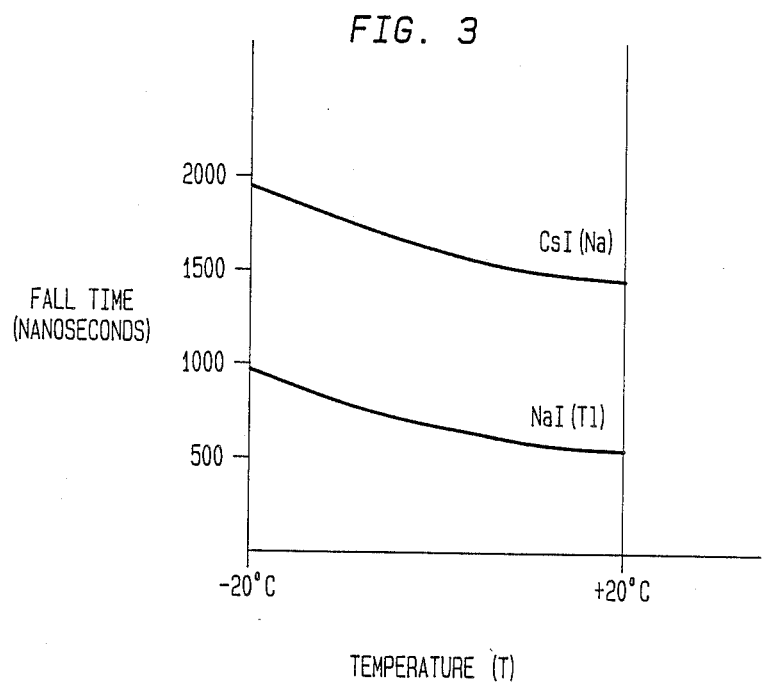
FIG. 3 is an exemplary illustration of the decay time versus temperature behavior of the FIG. 2 structure.

It is known that, within the same temperature range, the decay time characteristics of e.g. NaI(Tl) are distinguishable from the decay time characteristics of CsI(Na). One measure of decay time is the time required for a scintillation event to decay from 90% of its maximum amplitude to 10% of its maximum amplitude, and this is shown in FIG. 3 in an illustrative (not to scale) manner. Accordingly, in accordance with the preferred embodiment, the signal from the photomultiplier tube 38 is used to determine (a) the identity of the scintillator material in which the scintillation event has taken place and (b) the X coordinate of the scintillation event. Thus, a scintillation event E at location shown in FIG. 2 would (a) cause a signal to appear at the output of the photodiode 34 and (b) have a fall time of perhaps 600 nanoseconds. The signal from the photodiode 34 indicates that the event took place somewhere within region R. The decay time of 600 nanoseconds indicates (a) that the event took place in a NaI(Tl) scintillator and hence took place in scintillator strip 6 and (b) that the position of the event was ¼ of the distance between the first side 16 and the second side 18. Accordingly, these electrical outputs can be used to localize the event E to within area A.

The use of fall time as a measure of decay time is preferred because, in the temperature ranges which are currently under investigation, the fall time provides a basis upon which to distinguish between NaI(Tl) scintillations and CsI(Na) scintillations. However, the shapes of the decay time vs. temperature curves also differ between NaI(Tl) scintillations and CsI(Na) scintillations and these shape differences may also be used to accomplish the distinction. Persons skilled in the art can adapt the circuit 42 to measure whatever scintillation characteristics are used as the distinguishing features.

The use of two scintillation materials is not necessary to the invention. If photodiodes drop in price, one material may be used and a photodiode may be mounted to each strip. Alternatively, more scintillator materials may be used, to increase the number of strips in each group and thereby further reduce the number of photodiodes.

It may alternatively be possible to use PIN photodiodes instead of avalanche photodiodes. Also, if the scintillator strips are long, there may be two photodiodes for each, one at each of the ends.

Advantageously, the temperature along the first side 16 of the region is kept at 0° C. or below to reduce the effect of thermal noise on the outputs from the photodiodes 26, 28 and 30. To do this, a heat sink made of a material with comparatively high thermal conductivity may advantageously be fixed along the first side 16 of the region and cooled to an appropriate temperature, while another heat sink which is appropriately heated/cooled may be fixed along the second side 18. The method by which the thermal gradient is established is not part of the invention.

In use, the module disclosed alone can be replicated in whatever configuration is required, since the problem of "edge packing" is minimized. Thus, a plurality of such modules can be disposed so that all the scintillator strips occupy a common plane, or so that the surfaces of the modules form a desired configuraton, e.g., a surface which is a closed curve viewed on end and which surrounds a patient.

Those skilled in the art will understand that changes can be made in the preferred embodiments here described, and that these embodiments can be used for other purposes. Such changes and uses are within the scope of the invention, which is limited only by the claims which follow.

We claim:

1. A detector module for scintillation cameras, comprising:
   a plurality of elongated scintillator strips which have like physical dimensions and are elongated between first and second ends, one half of said plurality being of NaI(Tl) and the other half of said plurality being of CsI(Na), the scintillator strips being so arranged that they together define a region whih extends between first and second sides with all of the first ends of the scintillator strips lying on the first side and all of the second ends of the scintillator strips lying on the second side, the scintillator strips being arranged in a succession of NaI(Tl)-CsI(Na) pairs in a manner that adjacent scintillator strips are always of different scintillator materials;
   a plurality of photodiodes, each being uniquely associated with a particular pair of adjacent scintillator strips and being optically linked to the first ends thereof;

means for establishing a thermal gradient between the first and second sides;

a photomultiplier tube optically linked to the scintillator strips to register scintillation events occurring therein; and means for determining the decay time of scintillation events detected by the photomultiplier tube.

2. The module of claim 1, further comprising a plurality of light pipes, each optically linking a corresponding one of the photodiodes with the first end of each of the scintillator strips in a one of said pairs.

3. The detector module of claim 1, wherein the photodiodes are of the avalanche type.

4. The detector module of claim 1, wherein the photodiodes are of the PIN type.

5. The detector of claim 1, wherein said establishing means raises the temperature of the second side above the temperature of the first side.

* * * * *